Nov. 11, 1969   G. HENRY ET AL   3,477,838
GLASS DRAWING APPARATUS WITH DEFLECTING COOLERS
Filed June 10, 1966                    4 Sheets-Sheet 1

Inventors
Georges Henry
Edgard Brichard
Jean Marchand
Albert Bauduin
By *Spencer & Kaye*
Attorneys Nov. 11, 1969   G. HENRY ET AL   3,477,838
GLASS DRAWING APPARATUS WITH DEFLECTING COOLERS
Filed June 10, 1966   4 Sheets-Sheet 2

Inventors:
Georges Henry
Edgard Brichard
Jean Marchand
Albert Bauduin

By Spencer & Kaye
Attorneys

Nov. 11, 1969

G. HENRY ET AL 3,477,838

GLASS DRAWING APPARATUS WITH DEFLECTING COOLERS

Filed June 10, 1966

Inventors:
Georges Henry
Edgard Brichard
Jean Marchand
Albert Bauduin

By

*Spencer & Kaye*

Attorneys

Nov. 11, 1969   G. HENRY ET AL   3,477,838
GLASS DRAWING APPARATUS WITH DEFLECTING COOLERS
Filed June 10, 1966   4 Sheets-Sheet 4
FIG.7.
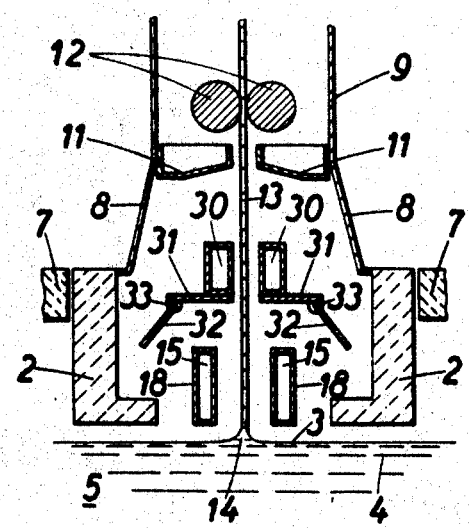
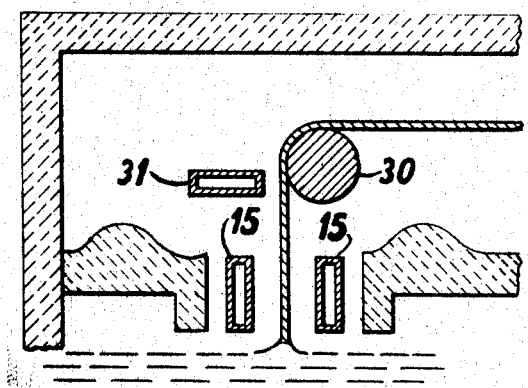
FIG.8.
Inventors:
Georges Henry
Edgard Brichard
Jean Marchand
Albert Bauduin
By Spencer & Kaye
Attorneys

United States Patent Office 3,477,838
Patented Nov. 11, 1969

3,477,838
GLASS DRAWING APPARATUS WITH DEFLECTING COOLERS
Georges Henry and Edgard Brichard, Jumet, Jean Marchand, Charleroi, and Albert Bauduin, Jumet, Belgium, assignors to Glaverbel S.A., Brussels, Belgium
Filed June 10, 1966, Ser. No. 556,711
Claims priority, application Luxembourg, July 22, 1965, 49,140
Int. Cl. C03b 15/02
U.S. Cl. 65—204                                    6 Claims

ABSTRACT OF THE DISCLOSURE

Process and apparatus in the drawing of sheet glass in which main coolers and auxiliary coolers are utilized. The auxiliary coolers are arranged so that descending currents of gas, which are thermally heterogeneous, are directed outwardly of the main coolers and away from the portion of the chamber between the main coolers and the drawn glass.

---

The present invention relates to the manufacture of sheet glass by continuous drawing from the surface of a bath of molten glass.

In the drawing of sheet glass, the formed glass is subject to imperfections as a result of non-uniform cooling of the glass in the region where the sheet is formed. Accordingly, much research has been directed towards the solution of this problme and as a result thereof, a variety of designs for glass drawing chambers has been proposed. One of the design features which has been widely accepted is the provision of cooling means at a small distance above the surface of the bath and on opposite sides of the line of draw. Additional proposals have been made to provide between such cooling means, hereinafter referred to as "the main coolers," and the top of the drawing chamber, at least one additional cooling means, hereinafter referred to as "the auxiliary cooler."

In practice, a large number of factors influence the cooling of the glass in the drawing chamber and thus the cooling action to which the glass is subjected in any given manufacturing plant employing main and auxiliary coolers will in part depend on these various factors. These factors include the design of the coolers and the spatial location, the shaping and design features of the drawing chamber, and the speed at which the glass is drawn. However, with all the other factors being equal, the provision of one or more auxiliary coolers between the main coolers and the top of the drawing chamber facilitates the attainment of a given quality of the drawing glass with a higher maximum drawing speed. Thus, the present invention is concerned with the drawing of sheet glass in a plant comprising main and auxiliary coolers in the drawing chamber.

It is readily apparent that the provision of one or more auxiliary coolers can not in itself ensure perfect cooling and therefore problems still remain in the cooling of the glass. In particular, in order to overcome the tendency for wave patterns and the so-called "hammering" effects to appear in the glass, the drawing speed of the glass must necessarily be restricted to a value lower than that which would be desirable from other points of view. Therefore, many design features have been proposed in order to attempt to realize the maximum potential benefit from the use of main and auxiliary coolers in a drawing chamber. However, such prior art proposals have not proved entirely successful.

It is therefore an object of the present invention to overcome the aforementioned defects of the prior art arrangements.

Another object of the present invention is to provide a method for obtaining the maximum potential benefit from the use of main and auxiliary coolers in the drawing chamber of a sheet glass manufacturing plant.

It is a further object of the present invention to provide an arrangement of main and auxiliary coolers in the drawing chamber of a sheet glass manufacturing plant for obtaining the maximum potential benefit of such coolers.

It is still another object of the present invention to cool the drawn sheet glass in such a manner so as to increase the drawing speed of such glass with respect to the speed of prior art arrangements.

The present invention is based on the discovery that for improving the cooling action in the drawing chamber so as to enable higher quality sheet glass and/or for obtaining higher drawing speeds, a substantial improvement is obtained if gas currents descending in the drawing chamber in the vicinity of an auxiliary cooler are deflected outwardly. That is, the descending gas currents are deflected in a direction away from the draw line, through the vertical plane in which the outer boundary of the lower positioned main cooler lies, and up to or towards the front or rear boundary wall of the drawing chamber depending upon which side of the draw line the coolers are positioned.

While the precise gas flow pattern within the drawing chamber may differ from one plant to another, it appears that the defects in the glass can arise as a result of non-uniform cooling in the drawing chambers employing main and auxiliary coolers are at least partially caused by thermally heterogeneous turbulent gas currents which are not capable of being predetermined and therefore easily controlled. These gas currents form mainly as a result of ambient air being drawn into the drawing chamber under the large pressure differential through the numerous cracks, crevices and joints which are invariably present in the walls of such drawing chambers. In prior art arrangements of glass manufacturing plants having auxiliary coolers, it is possible for any thermally heterogeneous gas mixture formed in the upper part of the drawing chamber to fall past the auxiliary coolers and quite near to the drawn glass sheet or at least nearer to the sheet than to the walls of the drawing chamber. It is not quite known why this results in defects in the glass, but a possible theory is that the relatively cooled gas mixture thus formed may penetrate the rising layers of hot gases next to the drawn sheet glas sand thereby cause the defects. However, the underlying theory as to the cause of these defects is not of any consequence and therefore the present invention is not limited to any particular theory.

In accordance with the present invention, the above objects and other ancillary thereto are accomplished according to the preferred embodiments of the present invention in which any gas currents descending from the upper portion of the drawing chamber are prevented from falling vertically past the auxiliary coolers into the region above the main coolers. Preferably, the gases cooled by contact with the auxiliary coolers are deflected outwardly so that these cold gas currents entrain any thermally heterogeneous gas mixtures descending from the top portion of the drawing chamber.

In accordance with the present invention, there is provided an arrangement including a drawing chamber for a glass manufacturing plant and having main coolers, at least one auxiliary cooler, and means in the vicinity of the auxiliary cooler for deflecting gas currents outwardly away from the line of draw.

In accordance with a feature of the present invention the deflecting means may be constituted at least in part by the auxiliary cooler structure such that the structure is designed and located as to extend laterally outwardly, i.e., away from the line of draw, and substantially beyond the outermost boundary of the main coolers. Preferably, the auxiliary coolers extend to positions located nearer the front and rear walls of the drawing chamber than to the draw line of the chamber. The upper deflecting faces of the auxiliary coolers may be horizontal or inclined, e.g., inclined downwardly away from the line of draw.

Additional objects and advantages of the present invention will become apparent upon consideration of the following description when taken in conjunction with the accompanying drawings in which:

FIGURES 3 to 7 are cross-sectional views of embodiments of drawing machines according to the present invention, each view showing the drawing chamber and part of the drawing tower.

FIGURE 8 is a cross-sectional view of an embodiment of the present invention for drawing chambers having a bending roller.

Figure 1:
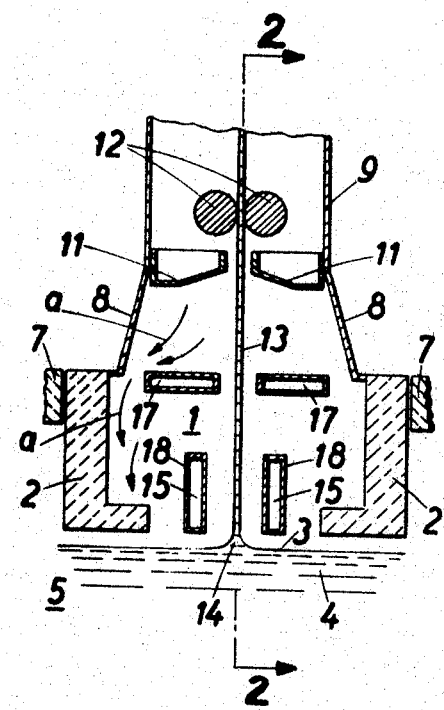
FIGURE 1 is a side elevational view, in cross section, of a portion of a sheet glass drawing machine according to the present invention and including a drawing chamber and a portion of the adjoining vertical drawing tower.

Before describing the invention in detail, it should be noted that there are two types of drawing processes. In one type, the glass drawn from the surface of the molten glass bath passes upwardly through the drawing chamber into a superimposed vertical tower within which the sheet glass continues to cool for being cut into sheets. In the other type, the glass drawn upwardly from the bath is bent about a so-called "bending roller" and passes horizontally out of the drawing chamber into a horizontal annealling lehr. The present invention is primarily concerned with the first type of process and in accordance with the present invention for such process, auxiliary coolers are disposed on opposite sides of the line of draw within the drawing chamber and gas currents descending in the vicinity of these auxiliary coolers are deflected towards the front and rear walls of the drawing chamber i.e., the boundary walls of the chamber facing the major surfaces of the drawn glass sheet. However, it should be noted that the invention is not exclusively limited to the first process and may be applied in the second type of process. In such cases, an auxiliary cooler located on the bending roller side of the drawn glass sheet, between the roller and the underlying main cooler, can often be dispensed with. Consequently, the invention includes not only an arrangement for the second type of process wherein auxiliary coolers are disposed on both sides of the line of draw, but also processes of that type wherein an auxiliary cooler is provided only on the side of the glass sheet opposite the side at which the bending roller is located. In such an arrangement, gas currents descending in the vicinity of this auxiliary cooler are again deflected otuwardly away from the draw line as described above. Thus, while FIGURES 1–7 illustrate the use of auxiliary coolers on opposite sides of the line of draw, it should be noted that alternative embodiments of the present invention, as exemplified by FIGURE 8, using only one auxiliary cooler are possible.

Referring now to the drawings, wherein like reference characters designate like or corresponding parts throughout the several views, there is shown in FIGURE 1 a drawing machine for the first type of drawing process and having a drawing chamber 1. The chamber is defined at the bottom by two conventional L-shaped blocks 2 which are placed above the surface 3 of the molten glass bath 4 contained in the glass drawing tank 5. The tank is formed by walls and a crown with the parts of one side wall 6 and the crown 7 being shown in FIGURES 1 and 2. The blocks 2 form the lower portion of the front and rear walls or boundaries of the drawing chamber.

Figure 2:
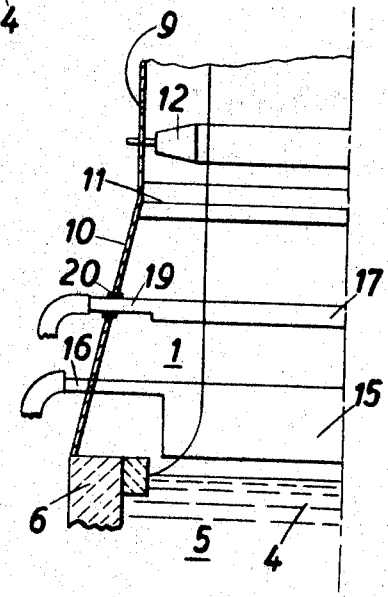
FIGURE 2 is a cross-sectional view of a part of the drawing machine of FIGURE 1 taken along line 2—2 of FIGURE 1.

The upper part of the drawing chamber 1 is defined by front and rear inclined walls 8 connected between the L-shaped blocks 2 and a glass drawing tower 9, and by end walls 10 only one of which is shown in FIGURE 2. As further shown in FIGURES 1 and 2, catch pans 11 are provided at the lower end of the tower 9 and within the tower, there is provided a series of pairs of rollers 12, only the bottom pair of which is shown, for drawing the sheet glass 13 from the meniscus 14 of the bath. It should be noted that the invention is primarily, although not exclusively, intended for application in sheet glass drawing plants in which the catch pans in the upper walls of the drawing chamber are not water cooled.

Within the drawing chamber 1 in the vicinity of the meniscus 14, there are provided two main coolers 15 disposed in a plane parallel with the drawn sheet glass and on opposite sides thereof. These two main coolers are in the form of rectangular boxes and are fed with a liquid coolant, e.g., water, by means of pipes 16 leading into and supporting the coolers at one end thereof. Above the main coolers 15 there are provided two auxiliary coolers 17 having a rectangular box-like structure. These coolers 17 are shown in horizontal positions in FIGURES 1 and 2, but in accordance with the present invention the positions of such coolers may be adjusted to different orientations. The auxiliary coolers extend outwardly, i.e., away from the sheet glass, beyond the faces 18 of the main coolers 15. As shown in FIGURE 2, the two auxiliary coolers are fed with a liquid coolant by means of pipes 19 which may be rotated within the bearings 20 in the end wall 10. Thus, by rotating the pipes within the bearings, the position of the auxiliary coolers may be varied.

During the drawing of the sheet glass in the illustrated machine, thermally heterogeneous gas mixtures form in the upper part of the drawing chamber in the vicinity of the walls 8, particularly as a result of the ingress of cold air currents through such walls. Thus, in accordance with the present invention, these thermally heterogeneous gas mixtures become entrained outwardly in the direction of the arrows $a$ by the flow of cold gases induced by the two auxiliary coolers 17. Due to the orientation of the auxiliary coolers with respect to the corresponding main coolers 15, the gas flows are directed immediately away from the drawn sheet glass and are caused to flow downwardly in the area close to the front and rear walls of the drawing chamber. Accordingly, with the aforedescribed arrangement, the thermally heterogeneous gas mixtures are deflected away from the sheet glass and therefore can not spoil the formation of the glass. Moreover, the sheet glass is cooled more uniformly than has heretofore been possible and the cooling can be more efficiently controlled. In consequence of the uniform and better control of the cooling, the drawing speed of the sheet glass can be increased without any resultant deformation in the glass.

In FIGURES 3 to 7, there are shown drawing machines which are similar to the drawing machine illustrated in FIGURES 1 and 2 and having different forms of deflecting means for the thermally heterogeneous gas mixtures in accordance with different embodiments of the present invention. Accordingly, only these different deflecting means will be referred to in detail.

Figure 3:
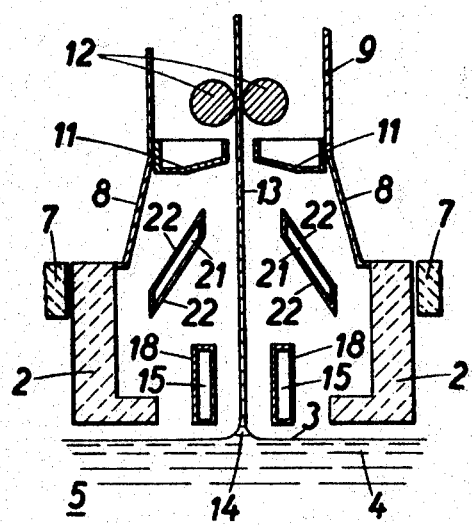

In FIGURE 3, the deflecting means for the drawing machine are constituted by two inclined auxiliary coolers 21. The inclined auxiliary coolers are each provided with upper and lower faces 22 and which are oriented at a substantial inclination with respect to the horizontal. As shown, these faces extend outwardly, substantially beyond the vertical faces 18 of the main coolers 15 so as to deflect the gaseous mixture into the region beyond the vertical planes in which the faces 18 of the main coolers lie.

Figure 4:
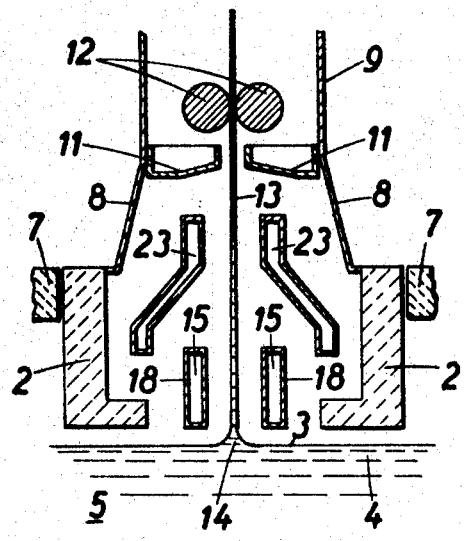

In FIGURE 4, the auxiliary coolers 23 extend over a considerable portion of the height of the drawing chamber. The auxiliary coolers are shaped so as to more efficiently direct the descending gas currents away from the sheet glass and are formed with a top vertical portion, an inclined middle portion and bottom vertical portion. As shown, the bottom vertical portion of the auxiliary coolers extends below the level of the top of the main coolers with the entire configuration of the auxiliary coolers being such as to aid in the deflection of the gas currents.

Figure 5:
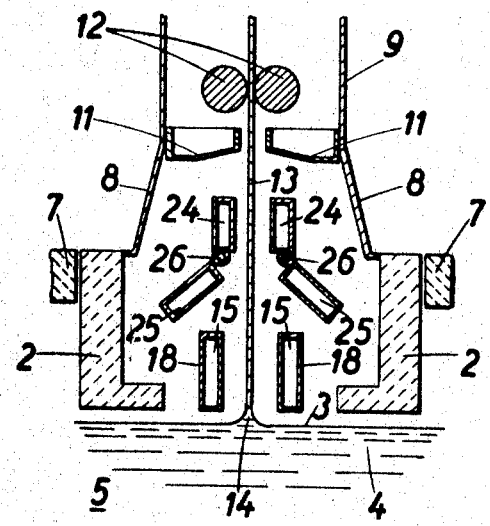
Figure 6:
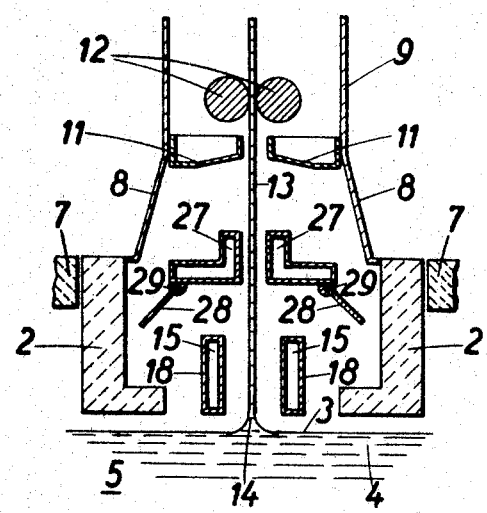

The different types of deflecting means used in the drawing machines which are illustrated in FIGURES 5 to 7, are particularly advantageous for use in drawing processes wherein relatively frequent changes in the thickness of the sheet glass during the production thereof are contemplated. Thus for example, in FIGURE 5 the auxiliary coolers are formed in articulated sections 24 and 25 with the section 25 being hingedly secured to section 24 at the hinge 26. As such, the angle of the lower section may be varied by turning this section about the hinge 26.

In FIGURE 6, the auxiliary coolers 27 are provided with plates or fins 28 which are secured to such coolers by hinges 29. Thus, the fins 28 may be swung about the hinges 29 for modifying the trajectories of the cold gas currents.

In the drawing machine according to FIGURE 7, the deflecting means comprise plates 31 welded to the bottom of the auxiliary coolers 30 with fins 32 being secured to these plates by hinges 33. In accordance with this embodiment, the plates and fins serve for deflecting the gas currents with the fins 32 being rotatable about the hinges 33.

FIGURE 8 discloses an arrangement for the second type of drawing process, i.e., the process in which the glass is drawn upwardly and bent about a bending roller and then passed horizontally out of the drawing chamber into a horizontal annealing lehr. As shown in this figure, two main coolers 15 are provided on either side of the draw line with a bending roller 30 being arranged above one of the main coolers for bending the glass sheet and passing the same into a horizontal annealling lehr. In such an arrangement, as previously discussed, the need for an auxiliary cooler on the side of the draw line having the bending roller is eliminated. Therefore, as shown, a single auxiliary cooler 31 is provided on the opposite side of the draw line and is positioned for deflecting the gas currents away from the glass sheet. Accordingly, with this embodiment, any of the auxiliary cooling structures shown in FIGURES 1 through 7 may also be used in this arrangement.

It can thus be seen that in accordance with the present invention, the auxiliary coolers are advantageously constructed and mounted so that the positions thereof can be adjusted, for example, rotated about a horizontal axis to vary the orientation of the upper deflecting faces thereof. The path or trajectories of the descending gas currents can then be adjusted to correspond to the volume of gas forming the current and thereby the cooling action may be better supervised and controlled. It should be noted that this adjustable feature is of particular advantage in a plant used for drawing sheet glass of various thicknesses. However, whether the auxiliary coolers are fixed or adjustable, the coolers may be of conventional shaping, for example, in the form of water-boxes of rectangular shape which are connected with a circulating cooling water system. Alternatively, each auxiliary cooler may also be composed of articulated sections.

It should also be noted that in accordance with the other features of the present invention, other deflecting means may be provided for achieving or assisting in the deflection of the gases achieved by the auxiliary coolers. For example, deflecting plates may be mounted on or adjacent to the auxiliary coolers in heat exchange relation therewith. These deflecting plates may be mounted so that their positions may be varied, e.g., the inclination of the plate. The deflecting surfaces, whether provided by the auxiliary coolers or by associated parts may extend downwardly to the level of the tops of the main coolers or into this region, or even to a level below the tops of such main coolers.

Accordingly, the above described arrangement for both types of drawing processes serve to deflect the descending gas currents within the drawing chamber in a direction away from the draw line and past the imaginary vertical plane in which the outer boundary of the underlying main cooler lies. Thus, through such an arrangement, the maximum potential benefit from the use of main and auxiliary coolers is attained in that the cooling of the drawn sheet glass is made more uniform and can be controlled more effectively. In consequence of this, there is provided the further advantage that the drawing speed of the sheet glass may be increased so that more quality glass may be produced within a predetermined period of time than has heretofore been possible with prior art arrangements.

What is claimed is:
1. A sheet glass drawing machine comprising, in combination:
   a drawing chamber into which sheet glass can be drawn from the surface of a bath of molten glass, such chamber having side walls and front and rear boundary walls which face the surface of the sheet glass;
   main cooling means located in said chamber on opposite sides of the line along which glass is drawn;
   at least one auxiliary cooling means spaced above the main cooling means along the line of draw within said drawing chamber, said at least one auxiliary cooling means being provided with deflecting surfaces extending beyond the vertical plane in which the outer boundary of the main cooling means lies for deflecting downwardly descending gas currents outwardly away from the draw line so as to pass through the vertical plane in which the outer boundary of the main cooling means lies and towards the region of the boundary wall of the drawing chamber associated with the auxiliary cooling means.

2. A sheet glass drawing machine as defined in claim 1 and further including a bending roller about which the drawn glass sheet is bent so as to leave the chamber in a horizontal position, a single auxiliary cooling means being provided on the opposite side of the line of draw from the bending roller, and a deflecting surface at least partially formed by said auxiliary cooling means being provided for deflecting gas currents during the drawing process which descend from the top of the chamber.

3. A sheet glass drawing machine as defined in claim 1 wherein said auxiliary cooling means is provided with at least one deflecting surface formed by a member in heat exchange relationship with said cooling means.

4. A machine as defined in claim 3 wherein said deflecting surface is mounted for movement to different positions within the chamber.

5. A machine as defined in claim 4 wherein said auxiliary cooling means is formed in articulated sections.

6. A machine as defined in claim 4 wherein said auxiliary cooling means is provided with a deflecting fin hingedly secured thereto for serving as a deflecting surface.

References Cited

UNITED STATES PATENTS

| | | | |
|---|---|---|---|
| 3,257,189 | 6/1966 | Zellers | 65—204 |
| 1,606,409 | 11/1926 | Fowle | 65—205 XR |
| 2,631,410 | 3/1953 | Drake | 65—205 |
| 3,097,942 | 7/1963 | James et al. | 65—204 XR |
| 3,223,510 | 12/1965 | Ward | 65—204 XR |
| 3,230,065 | 1/1966 | Shorr | 65—204 |
| 3,329,491 | 7/1967 | Zellers et al. | 65—204 XR |
| 3,355,276 | 11/1967 | Javaux | 65—204 XR |

S. LEON BASHORE, Primary Examiner

FRANK W. MIGA, Assistant Examiner

U.S. Cl. X.R.

65—83, 205, 356